United States Patent Office 2,733,710
Patented Feb. 7, 1956

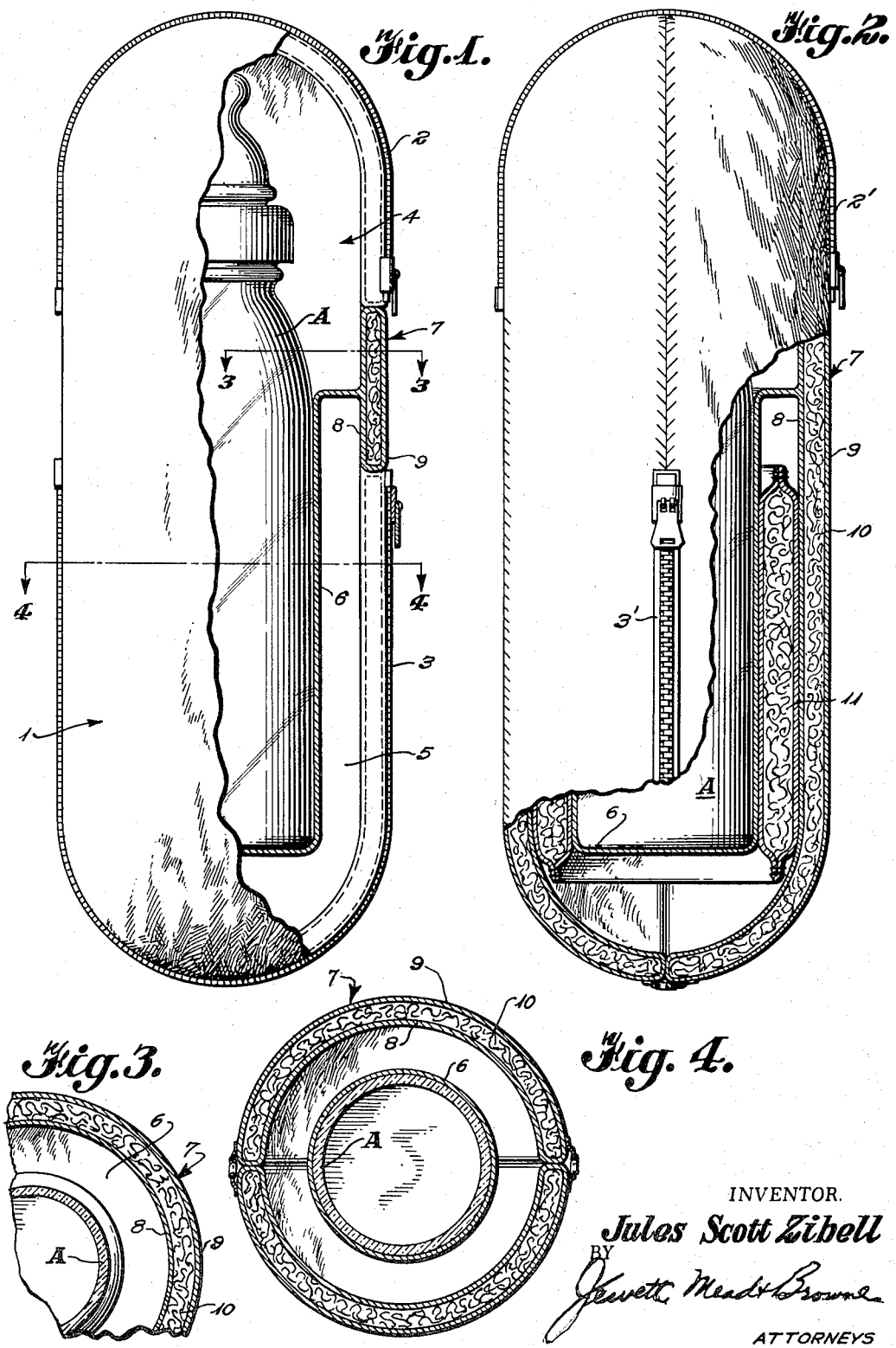

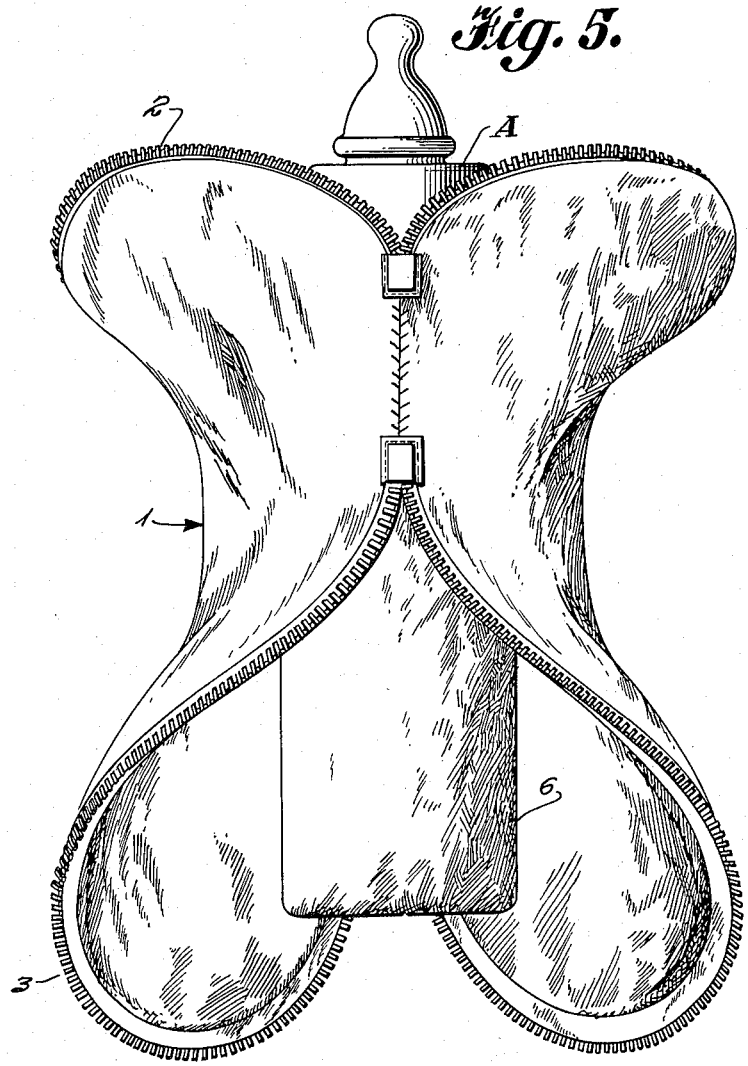
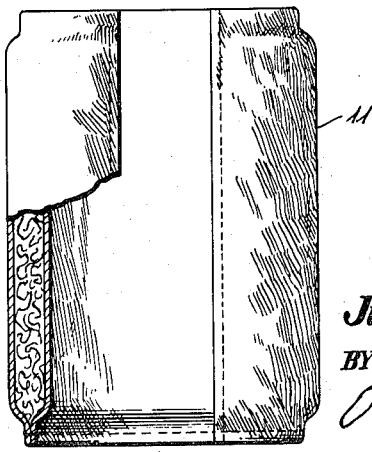

2,733,710

PORTABLE RECEPTACLE

Jules Scott Zibell, Decatur, Ga.

Application November 21, 1949, Serial No. 128,635

1 Claim. (Cl. 126—263)

This invention relates to portable receptacles of the compartmental type. More particularly the invention relates to insulated compartmental receptacles for keeping the contents either hot or cold, as desired.

In one of its more limited aspects the invention is directed to a unitary receptacle structure adapted to accommodate a removable container such as a nursery bottle or similar container, and is provided with an insulated cavity for a heating or cooling substance, together with unique and efficiently arranged closure means.

Numerous portable insulated receptacles have been made heretofore but for the most part such receptacles have been of poor insulating properties, unhandy to use and difficult to manipulate. In fact, prior to the present invention there has not been provided a portable receptacle of the compartmental type which is inexpensive to manufacture, easy to clean and simple to use. The receptacle of the present invention, however, possesses the attributes lacking in the prior structures.

It is an object of the present invention to provide a portable container of the character described, such container being formed with suitable compartments to which easy access is permitted and in connection with which suitably arranged closure means are provided. The receptacle is so designed that a heating or cooling material may be easily inserted in proximity to a nursery bottle or similar container for food, milk, water, or the like, which is to be heated or refrigerated, as desired. It is a further object of the present invention to provide in such a portable receptacle convenient access means to said heating or cooling substance as well as to the container enclosed within the receptacle. It is a still further object of the present invention to provide in such receptacle a structure permitting said heating or cooling substance to be maintained in proximity to but out of direct contact with the container disposed within the receptacle.

It is another object of the invention to provide a receptacle of the character described of simplified construction and relatively inexpensive to manufacture, the construction being such that the receptacle may be easily cleaned and yet provide the desired rigidity of structure, insulation properties and protection of the enclosed container from loss and/or breakage. Further objects of the invention will be apparent from the following description in connection with which the accompanying drawings show various embodiments of the invention.

Figure 1 is a side elevation of one form of the invention, portions thereof being cut away to show the construction of the receptacle and a container positioned within the receptacle;

Fig. 2 is a side elevation of an alternative form of the invention with a cut-away portion revealing a unitary heat exchange element positioned within the receptacle;

Fig. 3 is a partial cross-section taken along line 3—3 of Fig. 1;

Fig. 4 is a cross-section taken along line 4—4 of Fig. 1;

Fig. 5 is a side view of one form of the invention with the closure means in open condition; and Fig. 6 is a view of heat exchange element formed so as to function in cooperation with the receptacle and container of Figs. 2 and 5.

The device shown in Fig. 1 comprises a receptacle 1 having closure means 2 and 3 in the form of hookless fasteners providing access to container cavity 4 and heat exchange or insulating compartment 5, respectively. Compartment 5 is separated from cavity 4 by means of a partition wall 6 secured to receptacle wall or jacket 7 at the inner lining 8 thereof. Preferably there is provided an outer covering or wall 9, there being insulating material or batting 10 disposed between inner lining 8 and outer wall 9 of receptacle wall 7.

As indicated in Fig. 2 hookless fastener closure means 2', 3' may be disposed in a manner different from that shown in Fig. 1, the closure means 2 and 3 thereof operating in substantially the same or coincident plane and having the respective ends thereof substantially contiguous whereas closure means 2', 3' of Fig. 2 operate in intersecting planes, the respective ends of each means being out of alignment with the ends of the other means.

A nursery bottle or the like A shown positioned in cavity 4 is maintained in proximity to but out of direct contact with a heat exchange element 11 disposed in compartment 5. By providing cavity 4 with partition wall 6 to separate it from compartment 5 a loose or bulk heating or cooling substance such as an exothermic chemical or ice may be utilized in place of the unitary element 11 without any harmful effects which might otherwise result if such bulk substance were permitted to come into direct contact with container A and thereby contaminate it.

In the operation of the device it will be seen that hookless fastener closure 2 may be opened in the conventional manner to provide access to cavity 4 wherein container A may be inserted within the walls 6 which form a pocket attached to but annularly spaced from the outer wall 7 of the receptacle 1. Closure means 2 may then be closed to completely protect container A from contamination. Either before or after container A is inserted in cavity 4, suitable heat exchange material may be placed in compartment 5 by opening the hookless fastener 3 in the usual manner. The heat exchange material may be placed in compartment 5 so as to surround the major portion of container A but yet be held out of direct contact therewith by partition wall 6 which also forms a part of cavity 4 and serves as a pocket for the container A. Partition wall 6, being attached to wall 7, also serves to keep the heat exchange material from coming into contact with the upper portion of container A which, in the case of a nippled nursery bottle, might otherwise be contaminated. After the desired heat exchange material or element has been inserted in compartment 5, hookless fastener 3 is drawn around the lower end of the receptacle so as to completely enclose the heat exchange material or element within compartment 5.

It will be appreciated that if the partition wall 6 is secured to lining 8 of the receptacle at a point approximately midway between the ends of the receptacle the pocket may be reversed and the container be inserted from either end of the receptacle and the heat exchange material may be placed in the compartment formed at the opposite end of the receptacle. In such case, however, partition wall 6 should preferably be of less length than the compartment within which it is disposed. Stated otherwise, it should be less than half the length of the interior of the receptacle.

The embodiment shown in Fig. 2 operates in a manner similar to that shown in Fig. 1 but due to the fact that the hookless fasteners 2' and 3' in the respective ends of the receptacle shown in Fig. 2 operate in different planes the structure as a whole has greater rigidity, there is less likelihood for the strain on the central portion of the receptacle to result in tearing when hookless fasteners 2' and 3' are in the open position. It will be apparent that this type of construction requires a greater number of pieces of material for the receptacle and additional seams to join the material as shown by the stitching illustrated diagrammatically in Fig. 2.

Preferably the receptacle is made of flexible, waterproof or water-repellent material such as laminated, treated or impregnated fabric or rubber-like sheet material. If desired, however, it may be made of ordinary cloth with suitable padding to protect the container within the receptacle in case it is accidentally dropped.

Heat exchange element 11 may contain a mixture such as the following:

| | Parts |
|---|---|
| Aluminum powder | 30 |
| Sodium nitrate | 20 |
| Calcium hydroxide | 10 |
| Soda ash | 10 |
| Inert filler | 30 | or if preferred, the following mix may be used:

| | Parts |
|---|---|
| Sodium chlorate | 5 to 18 |
| Talcum powder | 7 to 18 |
| Aluminum powder | 5 to 18 |
| Copper sulphate | 2 to 18 |

Another mixture which may be used is:

| | Parts |
|---|---|
| Potassium chlorate | 18.00 |
| Cuprous oxide ($Cu_2O$) | 7.00 |
| Aluminum (coarse cuttings) | 22.80 |
| Iron filings | 1.50 |
| Filler (crushed silicates) | 50.70 |
| Zinc | Trace |

The foregoing compositions, when properly activated with water or the like, produce a sufficient amount of heat to warm the milk or other material in the container disposed within the receptacle of the present invention. If it is desired to provide a cooling or refrigerating material to preserve the food or the like in container A the heat exchange element 11 may contain a suitable chemical material which can be frozen into a slushy consistency but which remains sufficiently flexible for the heat exchange element to conform to the shape of the cavity in which it is disposed. A suitable composition for this purpose is disclosed in Kearney Patent No. 2,378,087. In this way the contents of the container may be kept under refrigeration for a substantial period of time.

For the purpose of effecting efficient insulation of the container, and yet effecting efficient heat exchange, it is found that partition wall 6 should be relatively thin to permit rapid heat transfer between the heat exchange element 11 and the container A and the wall 7 should be thick and preferably insulated with a suitable material 10 to maintain at a minimum the heat transfer between compartment 5 and the exterior of receptacle 1.

If desired the features of the present invention may be employed to advantage in a kit of the hand-bag type which can also be used for transporting extra clothing, diapers, foods, etc., such as are ordinarily used in the care of infants, particularly while travelling.

While suitable modifications may be made without departing from the spirit of the invention it is intended that the patent shall cover by suitable expression in the appended claim whatever features of patentable novelty reside in the invention.

I claim:

A portable receptacle comprising an elongated generally cylindrical outer wall of flexible heat insulating material, said outer wall having an opening at each end thereof, each of said openings extending from one side of said outer wall around the end thereof and to the opposite side of said outer wall, a zipper fastener associated with each opening whereby said openings may be opened or closed as desired, each of said openings lying in a plane which includes the axis of said generally cylindrical outer wall, the respective planes of the openings being substantially at right angles to each other, an inner wall extending inwardly from throughout the inner circumference of said outer wall, the plane of said inner wall being substantially at right angles to the longitudinal axis of said cylindrical outer wall and lying approximately midway between the ends of the outer wall, said inner wall having a generally cylindrical pocket-shaped wall portion of heat conducting material extending from said inwardly extending wall portion and opening adjacent said inwardly extending wall portion and toward one end of the outer wall, said pocket-shaped wall portion defining together with said outer wall an annular space located therebetween and extending lengthwise of said outer wall, said annular space communicating around substantially its entire circumference with the end of said outer wall opposite said one end and a substantially cylindrical heat exchange member located in said annular space, said heat exchange member surrounding said pocket-shaped wall member and being removable therefrom through said opposite end of said outer wall member.

References Cited in the file of this patent

UNITED STATES PATENTS

| | | |
|---|---|---|
| 485,098 | Forshew | Oct. 25, 1892 |
| 497,600 | Penniston | May 16, 1893 |
| 626,219 | Castle | June 6, 1899 |
| 803,756 | Gwynne | Nov. 7, 1905 |
| 1,010,768 | Isaacs | Dec. 5, 1911 |
| 1,411,032 | Jenkins | Mar. 28, 1922 |
| 1,860,302 | Thomas | May 24, 1932 |
| 1,874,882 | Brown | Aug. 30, 1932 |
| 1,979,222 | Goodwin | Oct. 30, 1934 |
| 2,123,031 | Weiner | July 5, 1938 |
| 2,185,799 | Blake et al. | Jan. 2, 1940 |
| 2,220,777 | Othmer | Nov. 5, 1940 |
| 2,261,221 | Bruner | Nov. 4, 1941 |
| 2,505,405 | Jarobe | Apr. 25, 1950 |
| 2,612,155 | Mendez | Sept. 30, 1952 |

FOREIGN PATENTS

| | | |
|---|---|---|
| 684,602 | France | Mar. 18, 1930 |
| 522,088 | Germany | Aug. 22, 1931 |